United States Patent

[11] 3,607,632

| [72] | Inventors | Ned P. Hansen;<br>Ralph W. Guenther, both of San Jose, Calif. |
|---|---|---|
| [21] | Appl. No. | 779,135 |
| [22] | Filed | Nov. 26, 1968 |
| [45] | Patented | Sept. 21, 1971 |
| [73] | Assignee | General Electric Company |

[54] NUCLEAR REACTOR ORIFICE-SEAL ARRANGEMENT
5 Claims, 12 Drawing Figs.

[52] U.S. Cl. .................................................. 176/43, 176/79, 176/56
[51] Int. Cl. ...................................................... G21c 15/22
[50] Field of Search ............................................ 176/43, 79, 56

[56] References Cited
UNITED STATES PATENTS

| 2,863,817 | 12/1958 | Morris .......................... | 176/43 |
| 3,009,868 | 11/1961 | Moulin ......................... | 176/43 X |
| 3,340,154 | 9/1967 | Sinclair et al. ................. | 176/79 X |

Primary Examiner—Carl D. Quarforth
Assistant Examiner—S. Hellman
Attorneys—Ivor J. James, Jr., Samuel E. Turner, John R. Duncan, Frank L. Neuhauser, Oscar B. Waddell and Melvin M. Goldenberg ABSTRACT: An orifice-seal arrangement, acting primarily as a coolant conduit, for nuclear reactors is disclosed. An orifice-seal consists of two coaxial telescoped tubes which are secured to a fuel assembly and to a wall of the coolant outlet plenum during reactor operation. The orifice-seal is adapted to conduct coolant from individual nuclear fuel assemblies to an outlet plenum, while sealing against coolant leakage. In addition, the orifice-seal supports the individual fuel assemblies in a manner accommodating slight radial movement of fuel assemblies and thermal expansion within the assemblies during changes in reactor temperature. The orifice-seal also functions as an indicator of proper core assembly during fuel loading and reloading.

INVENTORS:
NED P. HANSEN
RALPH W. GUENTHER

BY: John R. Duncan
ATTORNEY

3,607,632

NUCLEAR REACTOR ORIFICE-SEAL ARRANGEMENT

BACKGROUND OF THE INVENTION

Nuclear chain fission reactions and the reactors in which they take place are now well known. A typical reactor includes a chain-reacting assembly or core made up of nuclear fuel material contained in fuel elements. The fuel material is generally encased in corrosion resistant heat-conductive containers or cladding. The reactor core, made up of a plurality of these elements in spaced relationship in a plurality of bundles or assembles, plus control rods or blades incore instrumentation, etc., is enclosed in a container or shroud through which the reactor coolant flows. As the coolant passes between the spaced fuel elements, it is heated by thermal energy released in the fuel during the fission reaction. The heated coolant then leaves the reactor, the heat energy is used to perform useful work such as by driving a turbine generator set to produce electrical power, and the now-cooled coolant is recycled back to the reactor.

In typical commercial power reactors, the coolant is water which may be heated under pressure or evaporated in the core. Recently, reactors have been designed using steam as a coolant. In powerplants using reactors of this type, saturated steam enters the reactor and is superheated as it passes through the core. The superheated steam leaves the reactor, is desuperheated and condensed while performing useful work, and is reevaporated and recycled back to the reactor. This system is preferred for many applications, since steam at high temperatures and pressures is often more useful than the lower temperature steam produced by conventional pressurized water and boiling water reactors. For example, electrical power-generating turbines are generally more efficient and economical when driven by superheated rather than saturated steam.

Prior steam cooled reactor designs have been largely a compromise among various conflicting variables. For example, it is desirable that control rods or blades enter the core from the top, so that gravity will aid entry. However, it is also desirable that the steam coolant channels be designed for upward flow, so that when the reactor core is shutdown and flooded with water, the water can be circulated using, in part, natural convection (upward) circulation. Upward flow of coolant past the top entry control rods would, however, exert undesired hydraulic forces on the rods which may more than overcome gravitational forces.

In many prior steam cooled reactors it is necessary to direct a portion of the incoming saturated steam through nonfueled elements, such as control rods and instrumentation to cool them, instead of passing through the fuel in the core. This is disadvantageous, since the reactor outlet steam temperature is diluted as a result of mixing core outlet steam with steam which has bypassed the core to cool the nonfueled elements.

As is more fully described in copending U.S. Pat. application Ser. No. 778,998, filed concurrently herewith, it has been proposed that saturated steam enter the reactor and pass into a saturated steam inlet plenum just above the core, pass downwardly through nonfueled core components to an intermediate steam plenum, then upwardly through the fuel assemblies to a superheated steam outlet plenum located above the inlet plenum.

This system has been found to have a great many advantages. However, it is necessary that the superheated steam exiting the individual fuel assemblies pass through the inlet plenum on the way to the outlet plenum. A simple connecting orifice tube is not satisfactory, since it does not provide for radial assembly movement or for thermal expansion in the fuel assemblies, does not effectively thermally insulate the superheated steam within the tube from the saturated steam outside the tube and does not provide for convenient installation and removal of fuel assemblies. Thus, there is a continuing need for an improvement in this vital portion of the reactor.

SUMMARY OF THE INVENTION

It is, therefore, an object of this invention to provide a coolant orifice-seal means overcoming the above-noted problems.

Another object of this invention is to provide an orifice-seal means of improved reliability, simplicity and safety.

Still another object of this invention is to provide an orifice-seal means which provides accommodation for thermal expansion of fuel assemblies.

Still another object of this invention is to provide an orifice-seal means which provides an indication of proper core assembly during fuel loading and unloading.

The above objects, and others are accomplished in accordance with this invention, basically, by providing an orifice-sealing consisting of an inner orifice tube surrounded by an outer seal tube. In use, the seal tube is secured in an opening in a seal plate and projects downwardly therefrom through the inlet plenum to the fuel assembly. The fuel assembly is lifted slightly and secured to the orifice-seal so that the fuel assembly hangs from the orifice-seal in a manner permitting the fuel assembly to expand during reactor heat-up.

While this system is especially useful in a reactor of the fast-neutron steam-cooled type this orifice-seal arrangement has utility in other types of reactors, especially in those cooled by other gases.

The orifice-seal also serves as a universal joint between the changing positions of the fuel assembly outlet nozzles and the fixed hole positions in the seal plate. The positions of the fuel assembly nozzles change due to variations in fuel channel size, variations in core assembly tolerances and tightening requirements and variations in core temperature.

BRIEF DESCRIPTION OF THE DRAWINGS

Details of the invention, and additional advantages thereof, will be further understood upon reference to the drawings, which illustrate a preferred embodiment of the orifice-seal of this invention and a preferred reactor system in which this invention is especially useful.

In the drawings.

DETAILED DESCRIPTION OF THE INVENTION

Figure 1:
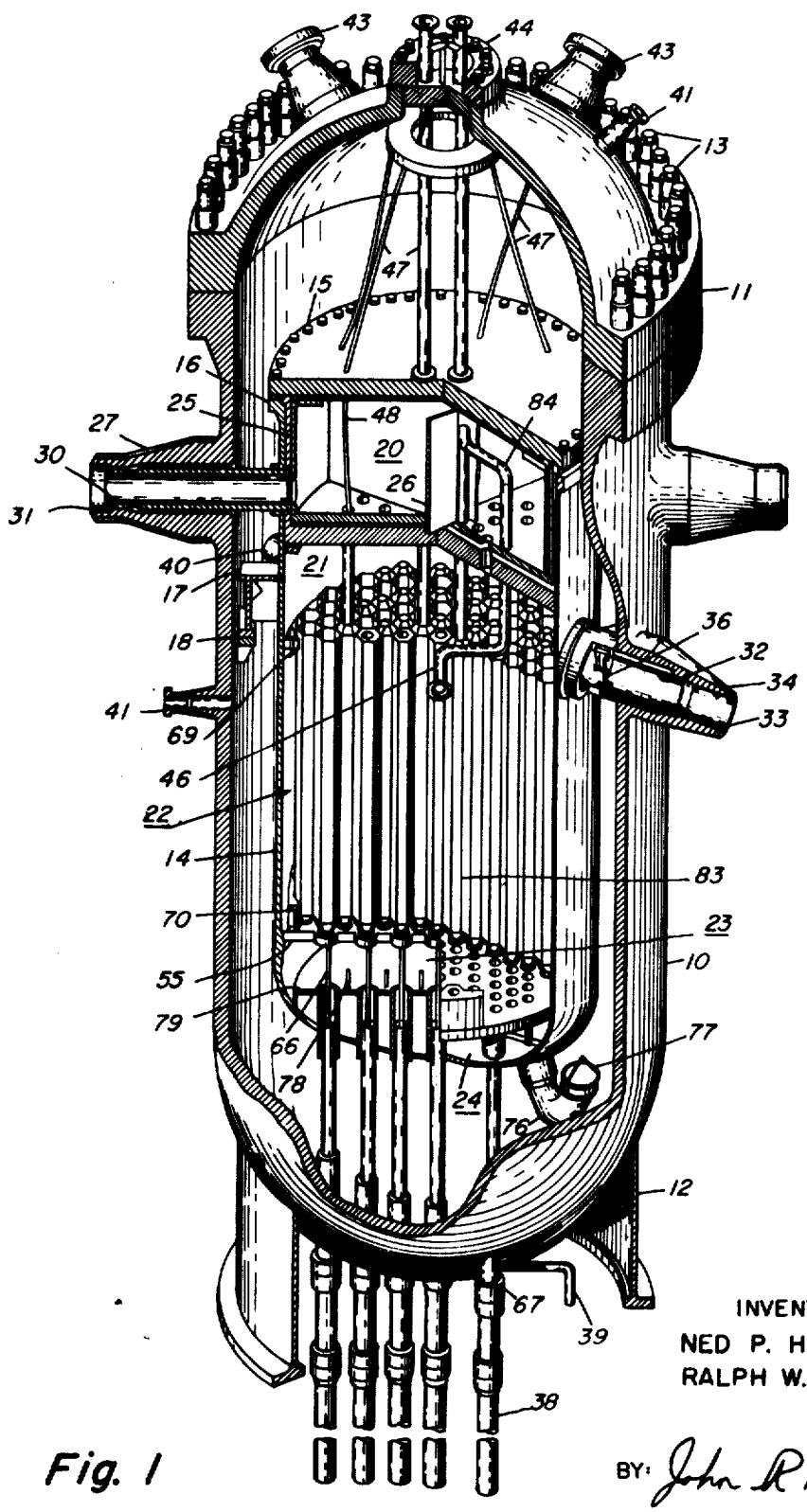
FIG. 1 is a perspective view, partly cut away and somewhat simplified for clarity of a steam-cooled nuclear reactor in which this invention is especially useful.

Referring now to FIG. 1, there is seen a simplified perspective view of a nuclear reactor including an open-topped pressure vessel 10 closed by a head 11. Pressure vessel 10 is supported by a skirt 12 for mounting on a suitable foundation (not shown). Head 11 is secured to pressure vessel 10 by a plurality of bolts 13.

Within pressure vessel 10 is mounted an open-topped shroud 14 closed by a closure flange 15 seated on shoulder 16. Shroud 14 is supported by means of flexible box-shaped supports 17 resting on an inwardly projecting support pad members 18 on the inner wall of pressure vessel 10. Supports 17 are rigidly fastened to support pads 18 so that a slight amount of radial flexing is permitted to compensate for differing thermal expansion of shroud 14 and pressure vessel 10 during reactor heat up and cool down.

Within shroud 14 are contained a superheated steam outlet plenum 20, a saturated steam inlet plenum 21, and a core and blanket space 22, a lower steam plenum 23 and a flooding water inlet plenum 24.

Outlet plenum 20 is closed at the top by closure flange 15 and at the sides and bottom by exhaust divider and holddown 25 which includes vertical dividing plates 26 which divide outlet plenum 20 into a plurality of pie-shaped segments. Superheated steam leaves each of the plenum segments through a superheated steam outlet 27. Typically, there may be six plenum segments and six outlets. Each of outlets 27 consists of an inner sleeve 30 secured to shroud 14 and in slidable sealing engagement with an outer sleeve 31. This permits the two sleeves to slide with respect to each other compensate for differential thermal expansion.

Saturated steam enters inlet plenum 21 through a similar arrangement of slidable inner sleeve 32 secured to shroud 14 within an outer sleeve 33, the combination of which makes up a saturated steam inlet 34. Typically, three such inlets may be arranged to deliver saturated steam to inlet plenum 21. A check valve 36 is located in each inner sleeve 32 to prevent loss of steam through inlet 34 should the saturated steam supply fail for any reason.

A plurality of control rod drives 38 penetrate the bottom of pressure vessel 10 and shroud 14. Only a few of the many control rod drives which would be used in a typical reactor are shown in FIG. 1 for clarity.

The space between the inner wall of pressure vessel 10 an shroud 14 is kept substantially filled with water during reactor operation. This provides neutron shielding and a convenient source of water to flood the core when the reactor is shut down. Water is admitted to this space through a shield and flood water inlet 40. Openings 41 are provided for instruments for monitoring and controlling the water level within pressure vessel 10. A cleanup line 39 is provided at the bottom of pressure vessel 10 to drain water therefrom, when desired.

Instrumentation outlets 43 and seal plug 44 are provided for the admission of steam sample lines, thermocouple connections, etc., into pressure vessel 10.

Figure 2:
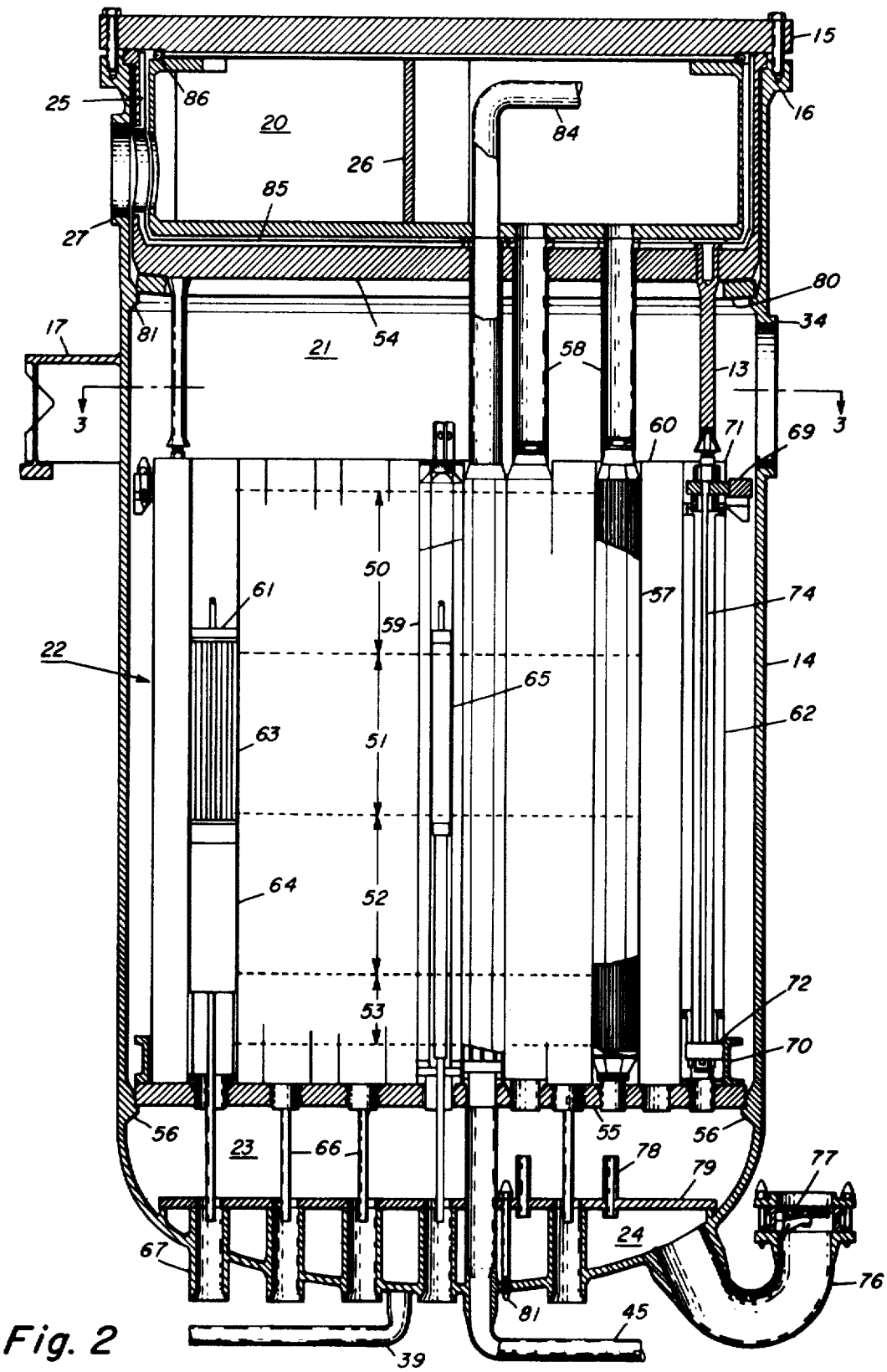
FIG. 2 is a vertical section through the core shroud containing the reactor internal components.

If desired, one test fuel assembly 83 may be provided with an individual stem inlet line 45 (as seen in FIG. 2) and superheated steam outlet line 46 so that special fuel assemblies may be testing during reactor operation.

A plurality of instrumentation leads 47 enter pressure vessel 10 through instrumentation outlets 43 and seal plug 44. The reactor is usually well adapted to permit individual sampling of steam output from each fuel assembly. A typical steam sampling line is shown at 48.

Figure 3:
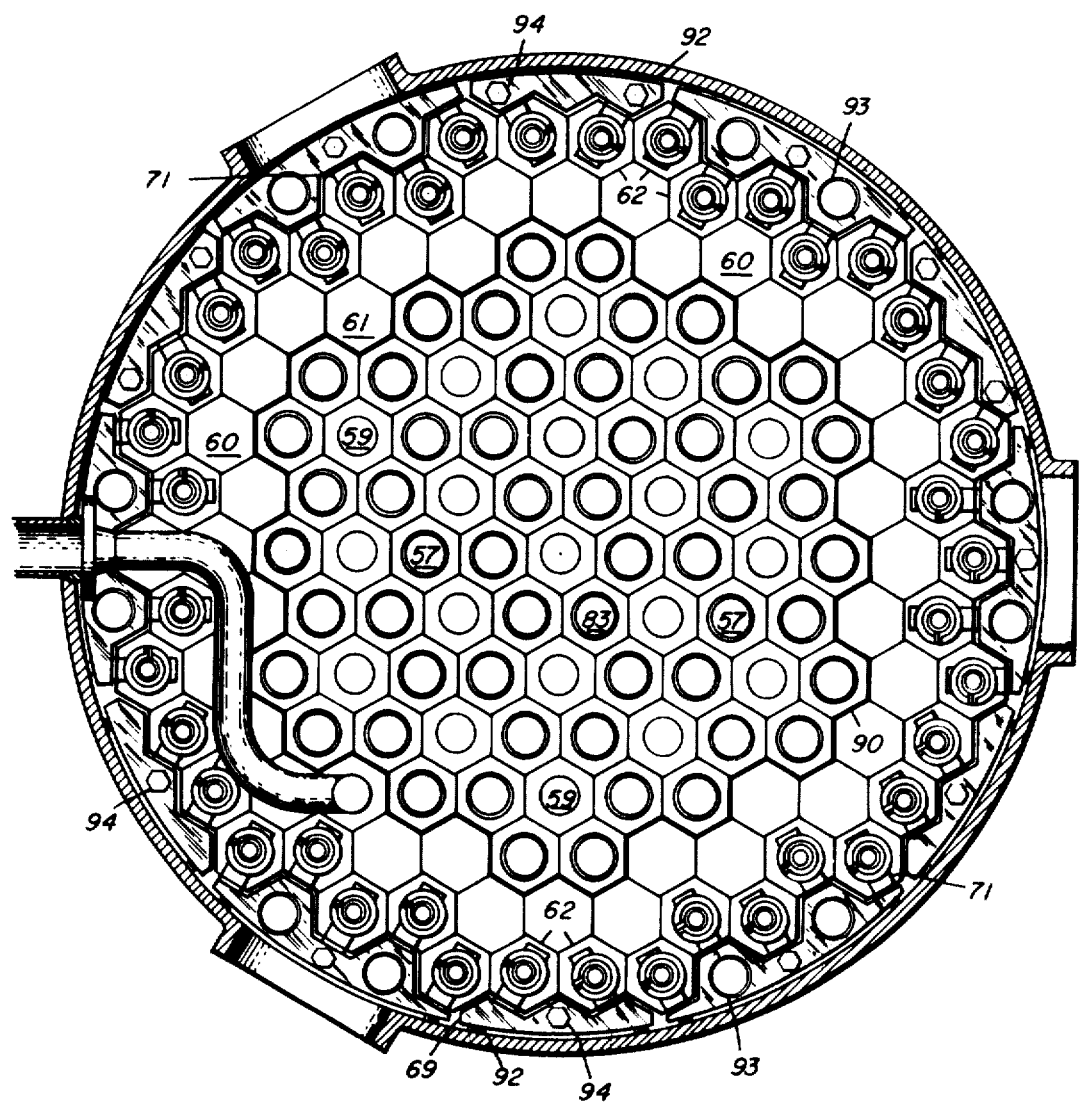
FIG. 3 is a horizontal section through the core shroud, taken on line 3—3 in FIG. 2.

Details of the arrangement of components within shroud 14 may best be understood by considering FIGS. 1 an 2 together. FIG. 2 shows a vertical section through shroud 14, somewhat simplified for clarity. While the core and blanket region contains many fuel subassemblies, control rods, reflector assemblies, etc., as seen in FIG. 3, only one of each is detailed in FIG. 2.

The overall reactor core 22 is divided axially into four sections, an upper blanket 50, an active fuel region 51, a lower blanket 52 and a gas plenum region 53. These sections are illustratively divided by dashed lines in FIG. 2. Radially, the overall reactor core 22 is divided into two sections, as best seen in FIG. 3. The central section consists of fuel subassemblies 57 and control assemblies 59 while the outer ring-shaped section consists of reflector assemblies 60, reflector-clamp assemblies 62 and reflector-control assemblies 61.

All of the subassemblies which make up overall core 22, except the fuel subassemblies, are supported at this lower end by core plate 55, which is in turn supported by an inwardly projecting shoulder 56 on shroud 14. As is further described below, the nonfuel assemblies are primarily made up of multirod subassemblies which permit saturated steam to flow downwardly through them from inlet plenum 21 to lower steam plenum 23.

Each of the fuel assemblies 57 is secured to an orifice-seal assembly 58 which depends from seal plate 54. The fuel assemblies are thus held out of weight-bearing contact with core plate 55, although a cylindrical extension on each fuel assembly passes through holes in core plate 55 in sliding contact therewith. The spacing between the fuel assemblies and core plate 55 allows for thermal expansion of the fuel assemblies during reactor operation. The fuel assemblies are described in greater detail copending U.S. Pat. application Ser. No. 778,998 filed concurrently herewith.

Reflector-control assemblies 61 include an upper control section 63 and a lower reflector section 64. Control section 63 includes a plurality of rods of a neutron-absorbing or poison material, such as boron carbide. Reflector section 64 includes a plurality of rods of a neutron reflecting material, such as nickel. In FIG. 2, the reflector-control assembly 61 is shown in the maximum control position, with the neutron-absorbing section adjacent fuel region 51. As assembly 61 is removed upwardly, control decreases as the neutron absorber is replaced by neutron reflector 64. Saturated steam passes downwardly through assembly 61, past the neutron-absorbing and reflecting elements. This steam tends to both cool the assembly and aid gravity in moving the control section into the maximum control position.

Reflector assemblies 60 each consists of a plurality of spaced rods comprising a neutron-reflecting material such as nickel within a hexagonal shroud.

Control assemblies 59 each include a plurality of spaced rods each containing neutron-moderating material such as beryllium oxide surrounding a cylindrical core within which a unit 65 made up of several neutron-absorbing rods is movable. Unit 65 is shown in Fig. 2 in the maximum control location. To increase the reactivity within fuel region 51, unit 65 is raised. Saturated steam coolant passes downwardly through each control assembly 59, cooling the assembly and aiding gravity in moving unit 65 into the fuel region in the event of an emergency.

All of the control assemblies 59 and reflector-control assemblies 61 are moved by conventional drive means (not shown) which connect to drive rods 66 through thimbles 67.

Around the outside of core 22 is located a ring of reflector-clamp assemblies 62. Around the upper and lower ends of core 22 are located an upper edge plate 69 and a lower edge plate 70, respectively. These plates conform to the irregular cylindrical shape of the core, as shown in FIG. 3. Within each of the reflector-clamp assemblies 62 is located a plurality of spaced rods made up of a neutron-reflecting material, such as nickel and a pair of rams 71 and 72, adapted to be moved outwardly against upper and lower edge plates 69 and 70 respectively, As these rams move outwardly, the clamp assembly shrouds press inwardly, clamping the core 22 tightly together. This prevents core movement during reactor operation which would result in undesired reactivity changes. A clamp holddown rod 73 engages the upper end of a torque rod 74 in each reflector clamp assembly 62. The reflector-clamp assemblies are described in greater detail in copending U. S. Pat. application Ser. No. 788,998 filed concurrently herewith.

During reactor construction, or after refueling, etc., the core is first assembled as shown. Then seal ring 80 is placed within shroud 14 in engagement with an annular, inwardly projecting ridge 81. When seal plate 54 is lowered into place, it engages and deflects the inner edge of seal ring 80. This results in an excellent gas and liquid seal between the wall of shroud 14 and seal plate 54. Orifice-seals 58 are lowered into place, then the fuel assemblies 51 are raised out of weight-bearing contact with core plate 55 and locked to orifice-seals 58.

Suitable tools are brought into engagement with ram drive rods 74 and operated to drive rams 71 and 72 outwardly to tightly clamp core 22 together.

Exhaust divider and holddown 25 is lowered into place. This holds orifice-seals 58 and holddown rods 73 tightly in place.

While most of the orifice-seals 58 align with openings in holddown 25 to deliver superheated steam thereinto, one or more may align with an individual test loop crossover pipe 84. Thus, and individual test fuel assembly may be provided with independent saturated steam inlet 45 and crossover pipe 84. While in a strictly power reactor this test loop may be eliminated, this reactor design is exceptionally well adapted to having such a test facility included.

Thermal insulation 85 may be provided to decrease heat transfer from superheated steam outlet plenum 20 to saturated steam inlet plenum 21, if desired.

Finally, closure flange 15 is installed. A plurality of rollers 86 are provided between closure flange 15 and exhaust divider and holddown 25 to permit pressure contact while allowing for differential thermal expansion.

As described above, when internal pressure within shroud 14 drops below a preset value, as during an emergency or during a reactor shutdown, the core is automatically flooded with water. One of several flooding valve assemblies 76 is shown in FIGS. 1 and 2. When shroud internal pressure drops, check valve 77 opens, admitting water into flooding water inlet plenum 24. A plurality of flooding nozzles 78 are arranged on closure plate 79, in alignment with the fuel assemblies in core 22. Plate 79 is held in place by a plurality of bolts 81. Slight leakage through the shroud into plenum 24 is immaterial, since both spaces are water-filled. Nozzles 78 immediately direct flooding water into the fuel assemblies to immediately begin cooling them. Since the flow of steam coolant during reactor operation is upward through the fuel assemblies, it is not necessary to reverse coolant flow during flooding. Also, flow of water through the fuel assemblies in the upward direction is aided by natural convection.

The overall reactor structure and internal components are described in further detail in U.S. Pat. application Ser. No. 778,998, filed concurrently herewith.

The layout of the various assemblies within the overall core is shown in FIG. 3, which is horizontal section taken through shroud 14 on line 3—3. This typical overall core 22 includes 54 fuel assemblies, 53 of which are regular fuel assemblies 57, and one of which is a test fuel assembly 83. Of course, if desired, in a strictly power plant reactor all of the fuel assemblies could be conventional and the test loop could be eliminated. Conversely, if desired, additional test loops could be easily added to this reactor.

A heavy black line 90 schematically indicates the border between the fuel region and the radial reflector region. Within the fuel region, in addition to the above-mentioned fuel assemblies, are included 19 control assemblies 59 which consist of neutron-absorbing control elements with neutron-moderating followers. The reflector region includes 18 reflector control assemblies 61, 18 stationary reflector assemblies 60 and 42 reflector-clamp assemblies 62.

The reflector-clamp assemblies 62 include movable upper rams 71 which bear against an interrupted upper edge plate 69 secured to the inner wall of shroud 14 by a plurality of fixed bolts 94 and adjustable bolts 92. Similar cooperating lower rams 72 and lower edge plate 70 are located at the lower end of reflector-clamp assemblies 62, as best seen in FIG. 2. As ram 71 and 72 press outwardly, the clamp assembly shrouds tightly press the core together.

A plurality of downflow tubes 93 pass through edge plates 69 and 70 to aid in conducting saturated steam from saturated steam inlet plenum 21 to lower steam passes downwardly through the nonfuel-containing core assemblies (e.g., control and reflector assemblies) and part through downflow tubes 93. Each of the fuel assemblies 57 is connected to an individual orifice-seal 58 which conducts superheated steam upwardly from the individual fuel assembly to outlet plenum 20, as seen in FIGS. 2 and 3.

Typically, in a core configuration such as that shown in FIG. 3, 16 of the control assemblies 59 and 61 may provide shim control, with the remaining 21 control assemblies providing scram or backup control.

Each of the 16 shim mechanisms may be driven in conventional manner by a single phase induction brake motor through an integral speed reducer. Each motor drives a screw mechanism extending up into driving engagement with the lower connector on the control mechanism.

Each of the 21 scram or backup control mechanisms may be actuated in a conventional manner by means of a double-acting hydraulic cylinder with a snubber at each end of the stroke. The hydraulic cylinder rod is coupled to the control rod extension shaft by a suitable coupling. Antirotation may be provided by eccentricity between the piston and the piston rod versus the cylinder bore. The rod may be cocked by metering pressure under the piston to overcome friction and gravity to raise the rod at a controlled rate. The control rod is scrammed by releasing the pressure supporting the control rod, thereby allowing the remaining forces to move the poison section of the control rod into the fuel region of the reactor core. Hydraulic forces within the hydraulic cylinder, gravitational forces on the control assembly, and hydraulic forces created by coolant passing downwardly around and through the control assembly combine to move the control assembly into the scram position. A cylinder snubber dissipates the kinetic energy of the control rod and connecting shafts at the end of the scram stroke. While this system is effective and reliable, and any other suitable drive system may be used to move the shim and scram control rods into and out of the fuel region of the reactor core.

Figure 4:
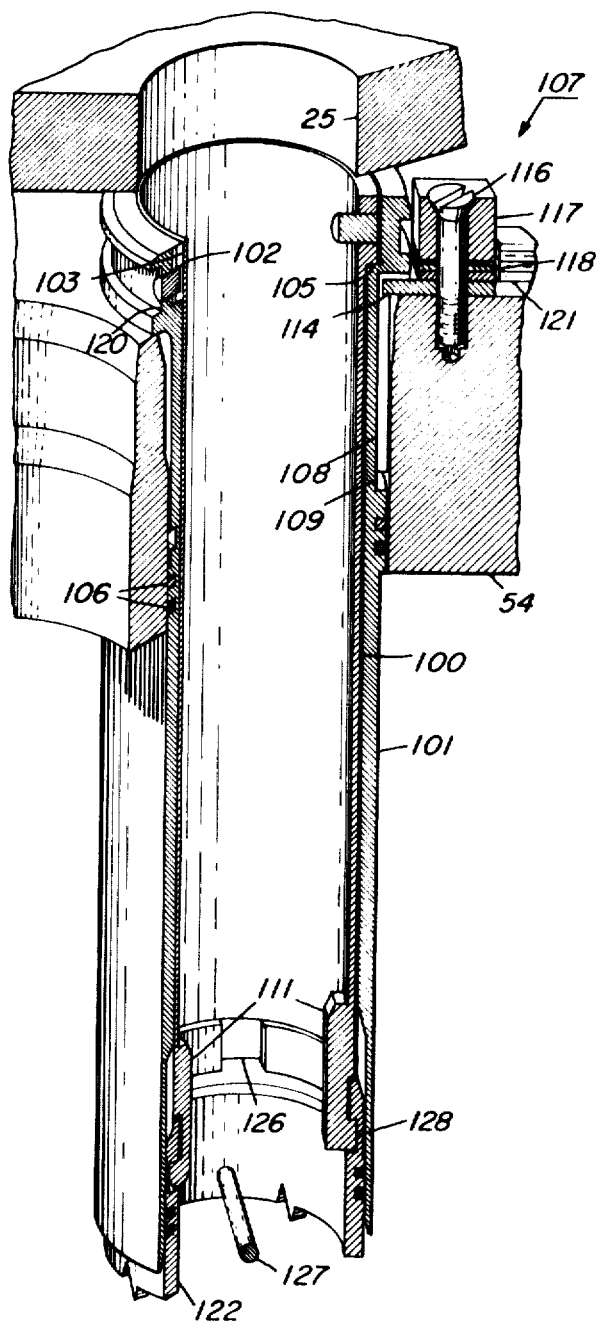
FIG. 4 is an isometric view, partly cut away, of an orifice-seal assembly according to this invention.

The overall structure of a typical orifice-seal 68 is best seen in FIG. 4 which shows an isometric view of an orifice-seal, partly cut away for clarity.

Orifice seal 58 consists of an inner orifice tube 100 and an outer seal tube 101. Tubes 100 and 101 are assemble together ad a pin 102 secured to seal tube 101 rides in an axial keyslot 103 in orifice tube 100.

In use, orifice-seal 58 is placed in an opening in seal plate 54. Compressible rings 106, in the nature of piston rings, seal the space between outer seal tube 101 and the wall of the opening.

The key assembly 107, described below, projects a finger 114 into a vertical groove 108. Vertical groove 108 terminates in a circumferential groove 109. Thus, orifice seal 58 may be lifted, then rotated so that key finger 114 projects into groove 109. When the orifice seal is released, it will be supported in this partially withdrawn position by the key finger. As is further discussed below, the projection of the orifice seal 58 above seal plate 54 will be clear indication to an observer that the orifice seal is not connected to a fuel assembly.

Means is provided at the lower end of orifice seal 58 for engaging the upper nozzle of a typical fuel assembly, such as that disclosed in copending U.S. Pat. application Ser. No. 778,998 filed concurrently herewith.

Figure 5:
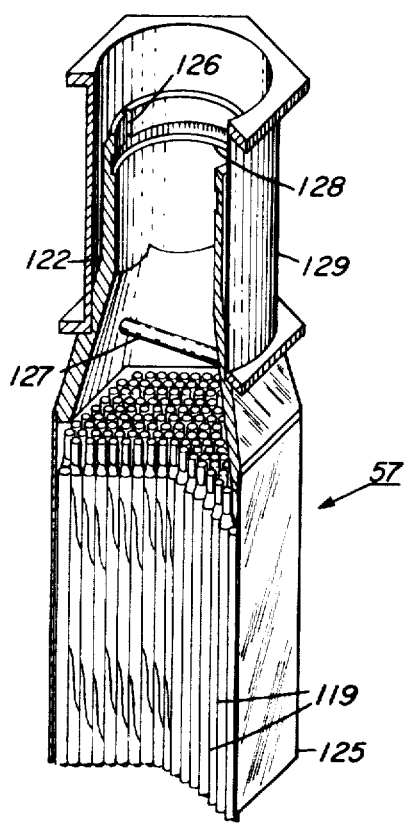
FIG. 5 is an isometric view of a typical fuel assembly useful with the orifice-seal arrangement of this invention.

FIG. 5 shows an isometric view of the upper portion of a typical fuel assembly useful with the orifice-seal of this invention.

The fuel assembly comprises a plurality of spaced parallel rods 119 containing nuclear fuel material, surrounded by an elongated hexagonal shroud 125.

A coolant outlet nozzle 122 surrounded by a thermal sleeve 129 is secured to the upper end of shroud 125. A lifting bar 127 is provided within nozzle 122. A connecting slot 126 and circumferential groove arrangement 128 is provided for connection to the orifice seal, as is further described below. While other types of fuel assemblies may be used with the orifice seal of this invention, it is preferred that the connecting portion have a configuration similar to that shown in FIG. 5.

FIGS. 6–9 shown in further detail the various operating positions of orifice seal 58.

Figure 6:
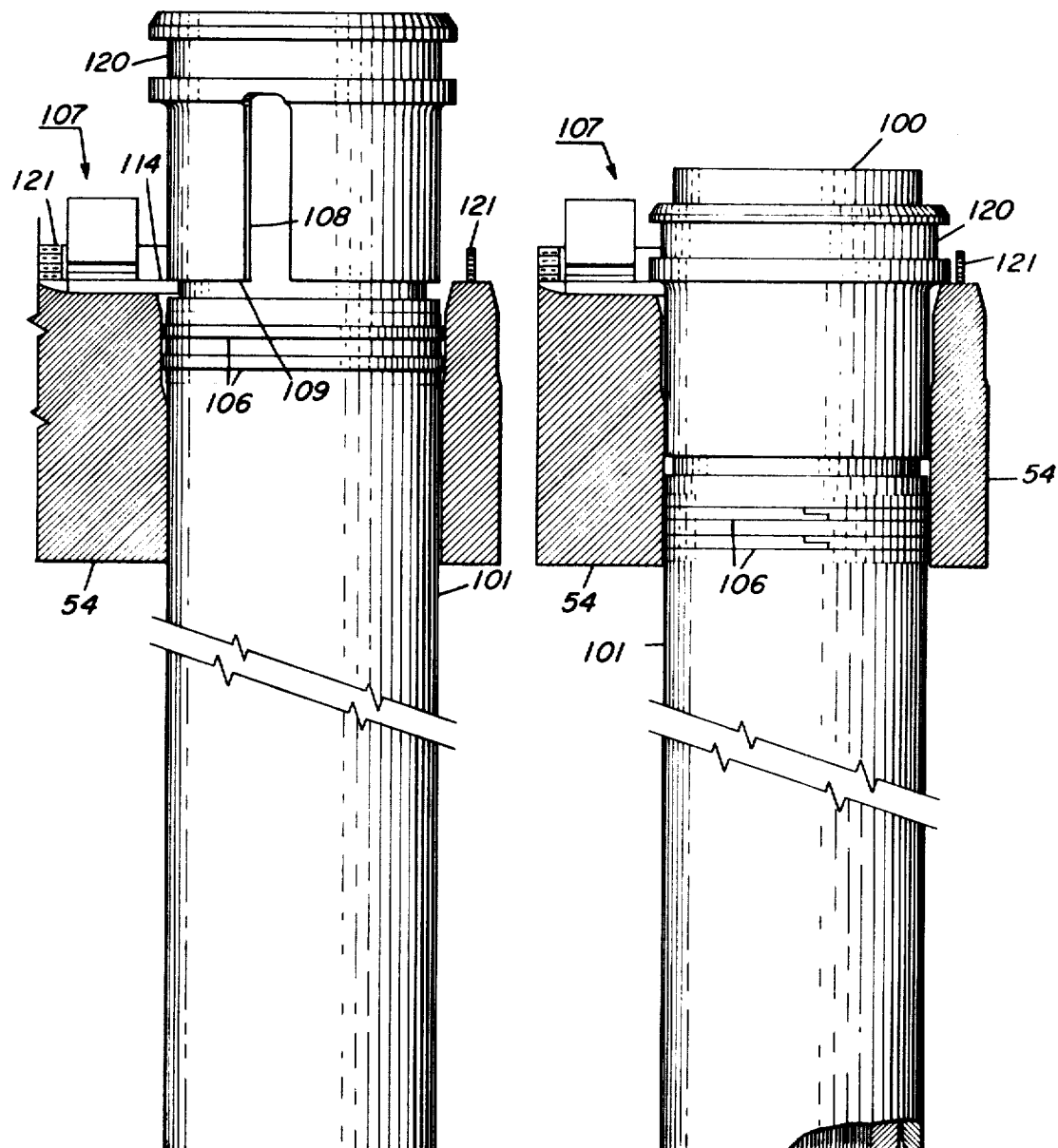
FIG. 6 is a vertical section through the orifice-seal shown in the raised position.

As seen in FIG. 6 orifice seal 58 is in the raised position. Finger 114 of key assembly 107 projects into groove 109, holding seal tube 101 in the raised position. Key assembly 107 is held in place by a flatheaded bolt 116 which extends through a block 117, shims 118 and key finger 114 into seal plate 54. Key assembly 107 thus functions both to hold orifice-seal 58 in place and space holddown 25 from the top surface of orifice-seal 58 during reactor operation, as seen in FIG. 8.

Preparatory to connecting orifice-seal 58 to a fuel assembly 57, seal tube 101 is lowered by engaging an actuating tool latch in groove 120, rotating the orifice-seal until vertical groove 108 aligns with key finger 114, then lowering tube 101. Orifice seal 58 is then in the position shown in FIG. 7, with bayonet lugs 111 just above upper nozzle 112 of a fuel assembly.

Figure 7:
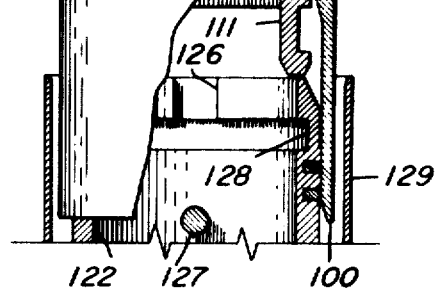
FIG. 7 is a vertical section through the orifice-seal shown in the sealed but unlatched position.
Figure 8:
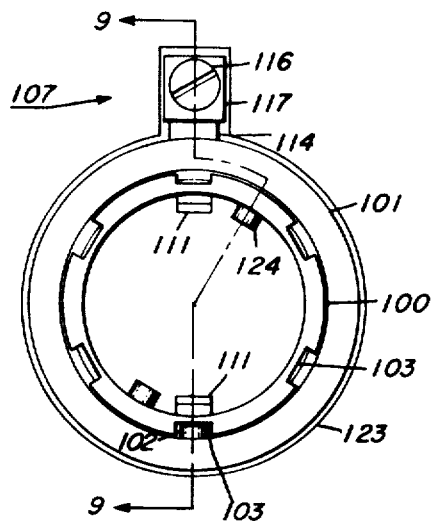
FIG. 8 is a plan view of the orifice-seal assembly.

FIGS. 7 and 8 shown orifice seal 58 in the lowered position. Thermal insulation 121 between seal plate 54 and holddown 25 is cutaway from around orifice-seal 58 and key assembly 107 as indicated by line 123 in FIG. 8. An inwardly projecting pin 124 is provided to enable the actuating tool to rotate orifice tube 100. Bayonet lugs 111 are provided for engagement with a fuel assembly nozzle. As seen in FIG. 7, orifice tube 100 is raised so that pin 102 is below slots 103. Orifice tube 100 is rotated slightly so that pin 102 does not lineup with any slot 103. Thus, orifice tube 100 when released will be supported in the position shown in FIG. 7 by pins 102 bearing on a shoulder 105 intermediate slots 103.

Figure 9:
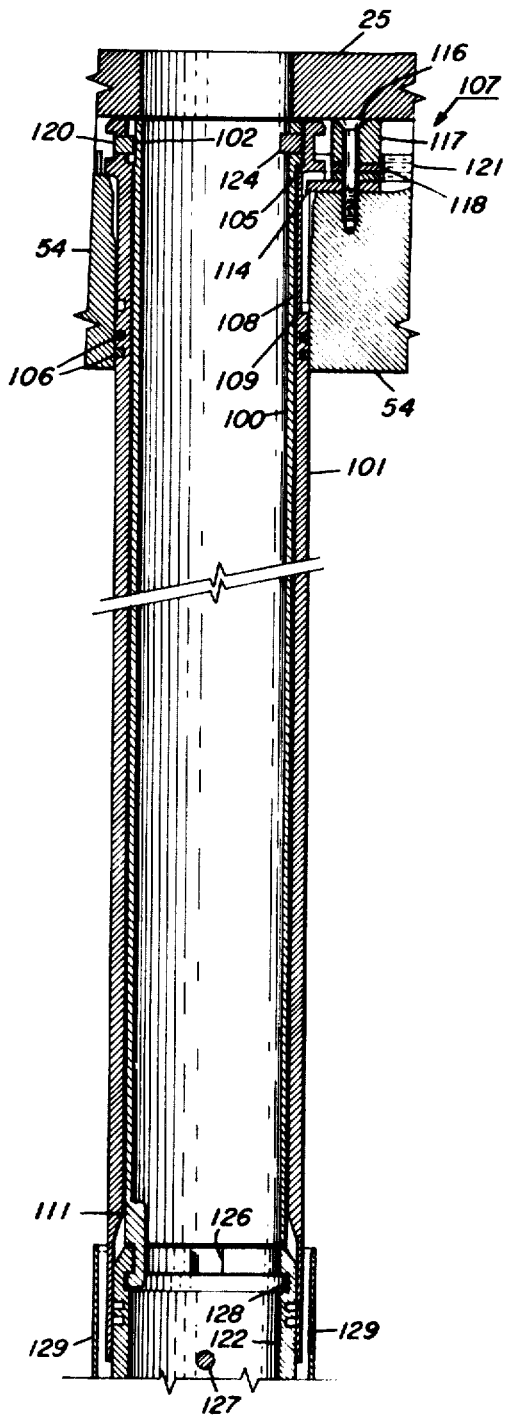
FIG. 9 is a vertical section through the orifice-seal shown in the reactor operation position, taken on line 9—9 in FIG. 8.

FIG. 9 shows orifice seal 58 in engagement with upper nozzle 122 of a fuel assembly. This connection is accomplished by rotating orifice tube 100 to align bayonet lugs 111 with vertical slots 126, then, lifting the fuel assembly by means of lifting bar 127, then rotating orifice tube 100 to engage bayonet lugs 111 within circumferential groove 128 and to align keyslot 103 in the upper end of tube 100 with pin 102. The fuel assembly and the tube 100 are lowered to the position shown in FIG. 9. When the actuating tool is removed, the fuel assembly is supported entirely by orifice seal 58. Since orifice tube 100 can be lowered only when pin 102 aligns with a slot 103, engagement between lugs 111 and groove 128 is assured, and is thereafter maintained since orifice tube 100 cannot be rotated while pin 102 is in a slot 103. With a typical fuel assembly, lifting the fuel assembly above 0.25 to 0.75 inch will be sufficient to provide for thermal expansion in the fuel assembly during reactor operation.

Figure 10:
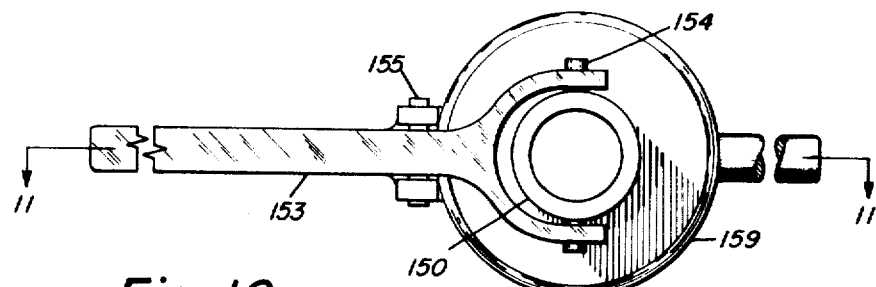
FIG. 10 is a plan view of an orifice-actuating tool for moving the orifice-seal among the several operating positions.
Figure 11:
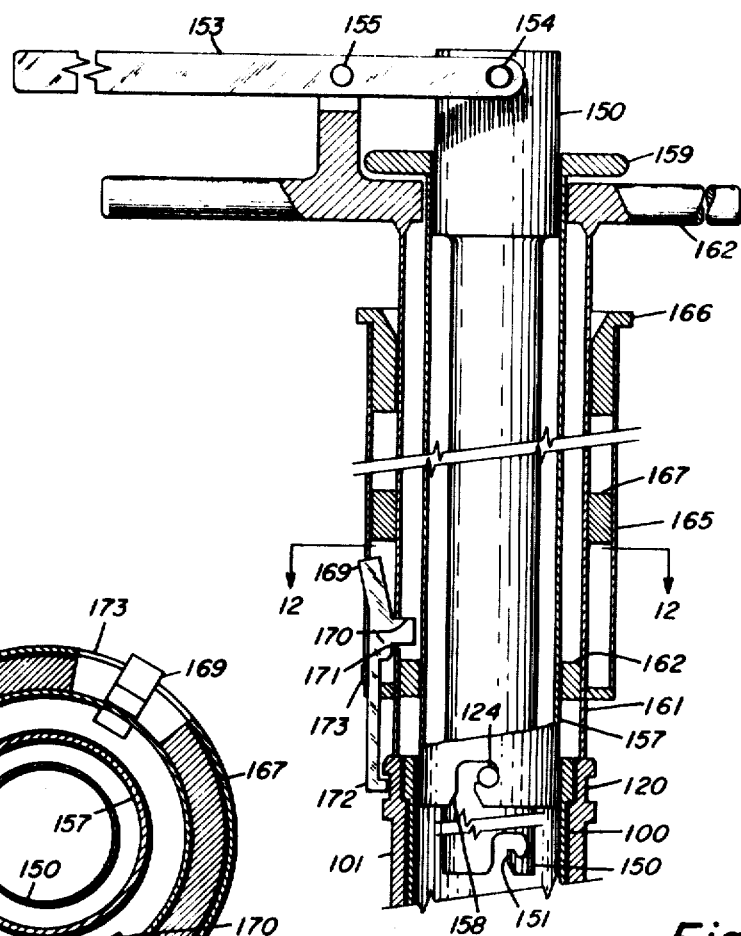
FIG. 11 is a vertical section through the orifice-actuating tool, taken on line 11—11 in FIG. 10.
Figure 12:
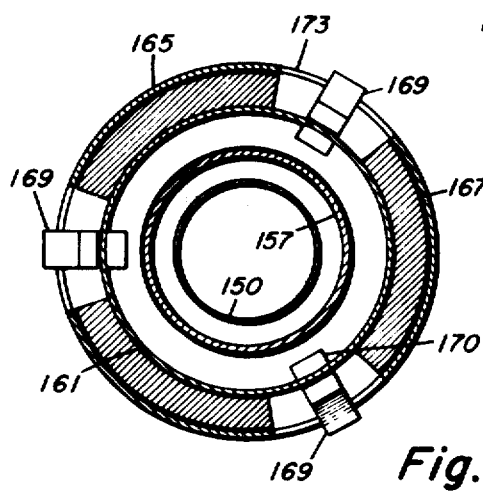
FIG. 12 is a horizontal section through the orifice-actuating tool, taken on line 12—12 in FIG. 11.

A typical actuating tool which may be used to move orifice seal 58 among the several operating positions is shown in FIGS. 10–12. FIG. 10 shows a plan view of the actuating tool while FIG. 11 shows a vertical section through the tool taken substantially on line 11–11 in FIG. 10. FIG. 12 shows a horizontal section through the tool taken substantially on line 12—12 in FIG. 11.

As seen in these figures the tool consists primarily of four concentric tubes. The inner lift tube 150 has a pair of opposed slots 151 at the lower end thereof. Slots 151 are designed to slip over the lift bar within the fuel assembly nozzle and lock thereto upon rotation of tube 150. The upper end of lift tube 150 is pivotably secured to a lift bar 153 by a pin and slot arrangement 154. When the free end of lift bar 153 is pushed downward it pivots about pin 155 lifting the fuel assembly. Surrounding lift tube 150 is orifice-actuating tube 157. Orifice-actuating tube 157 has a slot 158 at the lower end thereof adapted to engage a pin 124 extending inwardly from orifice tube 100. When slot 158 has engaged pin 124 orifice-actuating tube 157 is rotated by means of handwheel 159 to rotate bayonet lugs 111 into groove 128 on the fuel assembly (as seen in FIG. 9). Surrounding orifice actuating tube 157 is a support tube 161 secured to and depending from main bar 162. Support tube 161 is spaced from orifice actuating-tube 157 by a spacer ring 164 secured to support tube 161. Support tube 161 is surrounded by a latch tube 165. Tube 165 is spaced from tube 161 by an upper ring 166 secured to latch tube 165 and a sleeve 167 secured to support 161. Portions of sleeve 167 and latch tube 165 are cut away (as best seen in FIG. 12). Latch members 169 are located within these cutaway portions. A foot 170 on each latch member 169 protrudes through an opening 171 in support tube 161 permitting latch 169 to pivot about this point. A downwardly extending finger 172 on each latch member 169 is adapted to engaged groove 120 around the top of seal tube 101.

As seen in FIG. 11, fingers 172 are locked in position in groove 120 by a portion 173 of latch tube 165 which abuts the side of fingers 172. Latch members 169 are disengaged by lifting latch tube 165 so that portion 173 engages the outwardly sloping upper motion of each latch member 169.

During assembly of the reactor core, all of the orifice seals are installed in the raised positions shown in FIG. 6. The orifice-actuating tool is positioned over a given orifice seal 58 with latch tube 165 in a raised position over a given orifice seal 58 with latch tube 165 in a raised position. Latch tube 165 is then lowered so that fingers 172 on latch member 169 engage groove 120 in seal tube 101. Slot 158 is then brought into engagement with pin 124 on orifice tube 100. Main bar 162 is then rotated, rotating orifice-seal 58 until slot 108 aligns with key finger 114. The entire orifice seal 58 is then lowered into the sealed but unlatched position shown in FIG. 7. The free end of lift bar 153 is then raised lowering inner lift tube 150 so that slot 151 engages lift bar 127 in the fuel assembly nozzle. Main bar 162 is rotated slightly to insure engagement of the lift bar in slot 151. The free end of lift bar 153 is then depressed to lift the fuel assembly. Handwheel 159 is then rotated slightly to rotate orifice tube 100 sufficiently in that bayonet lugs 111 enter groove 128 in the fuel assembly nozzle, It is them possible to rotate orifice tube 100 further until pin 102 engages slot 103. When pin 102 enters slot 103, orifice tube 100 is locked against further rotation which might disengage lugs 111 from groove 128. Slot 151 may then be disengaged from lift bar 127. Slot 158 is next disengaged from pin 124. Latch tube 165 is raised to disengage latch members 169 from the orifice seal. The orifice-seal actuating tool may then be moved to the next assembly and the above-described steps are repeated.

While the orifice-seal assemblies of this invention may be operated manually or with any suitable tool, the above-described actuating tool is simply and effective and is, therefore, preferred for use with the orifice seals of this invention.

Although specific arrangements and proportions have been described in the above description of a preferred embodiment, other suitable arrangements and components may be used ad indicated above, with similar results.

Other modifications and ramifications of the present invention will occur to those skilled in the art upon reading the present disclosure. These are intended to be included within the scope of this invention.

We claim:

1. In a nuclear reactor including at least one nuclear fuel assembly containing fissile material within a shroud, inlet plenum means to direct coolant into said fuel assembly and outlet plenum means to receive heated coolant from said fuel assembly; the improvement wherein said coolant is directed from said fuel assembly to said outlet plenum through an orifice seal assembly, said orifice seal assembly comprising a pair of concentric tubes consisting of an inner orifice tube and an outer seal tube, means on the outer surface of said seal tube permitting said assembly to be supported in an upper and a lower position, means supporting said orifice-seal assembly in downwardly projecting relationship to an opening in a plate, connector means on the lower end of said orifice tube adapted to couple in supporting and fluid flow relationship to said fuel assembly and mean permitting rotation of said orifice tube independent of said seal tube to engage said connector means with said fuel assembly.

2. In the reactor according to claim 1, said orifice seal assembly further including a first fluidtight seal means between said assembly and said plate.

3. In the reactor according to claim 2, said orifice-seal assembly further including second fluidtight seal means adapted to seal the space between said orifice-seal assembly and said fuel assembly whereby fluid entering said orifice-seal assembly and said fuel assembly whereby fluid entering said orifice-seal assembly from said fuel assembly substantially entirely passes through said opening in said plate.

4. In the reactor according to claim 1, said orifice seal assembly further including cooperating pin means on one f said tubes and plural axial slot means on the other of said tubes, said pin adapted to enter one of said slots after said connection means has engaged a fuel assembly to lock said tubes against further rotation and lock said connection means to said fuel assembly.

5. In the reactor according to claim 1 wherein said orifice seal assembly includes a key means mounted on said plate projects into interconnected axial and radial slots on said outer seal tube whereby when said key means is in said radial slot said outer seal tube is held in said raised position and when said key means is in said vertical slot said seal tube is in a lowered position and secured against rotation.